United States Patent [19]

Keck

[11] 4,236,786
[45] Dec. 2, 1980

[54] METHOD OF EFFECTING COUPLING OF SELECTED MODES IN AN OPTICAL WAVEGUIDE

[75] Inventor: Donald B. Keck, Big Flats, N.Y.

[73] Assignee: Corning Glass Works, Corning, N.Y.

[21] Appl. No.: 969,233

[22] Filed: Dec. 13, 1978

[51] Int. Cl.³ .............................................. G02B 5/14
[52] U.S. Cl. ........................................ 350/96.15; 65/2
[58] Field of Search ............... 350/96.15, 96.18, 96.31; 65/2, 5, 13; 264/210 F

[56] References Cited

U.S. PATENT DOCUMENTS

| | | | |
|---|---|---|---|
| 3,666,348 | 5/1972 | Marcatili | 350/96.15 |
| 3,687,514 | 8/1972 | Miller et al. | 350/96.15 |
| 3,831,038 | 8/1974 | Dabby et al. | 350/96.12 |
| 3,909,110 | 9/1975 | Marcuse | 35/96.15 |
| 4,163,601 | 8/1979 | Olshansky | 350/96.15 |

*Primary Examiner*—Stewart J. Levy
*Attorney, Agent, or Firm*—Walter S. Zebrowski; William J. Simmons, Jr.; Richard E. Kurtz

[57] ABSTRACT

Coupling among discrete propagation modes of light energy is achieved by providing perturbations of finite length in an optical waveguide. An optimal function characterizing the perturbation is disclosed along with a method of implementing the function to obtain uniform coupling strength over a desired range of modes.

13 Claims, 9 Drawing Figures

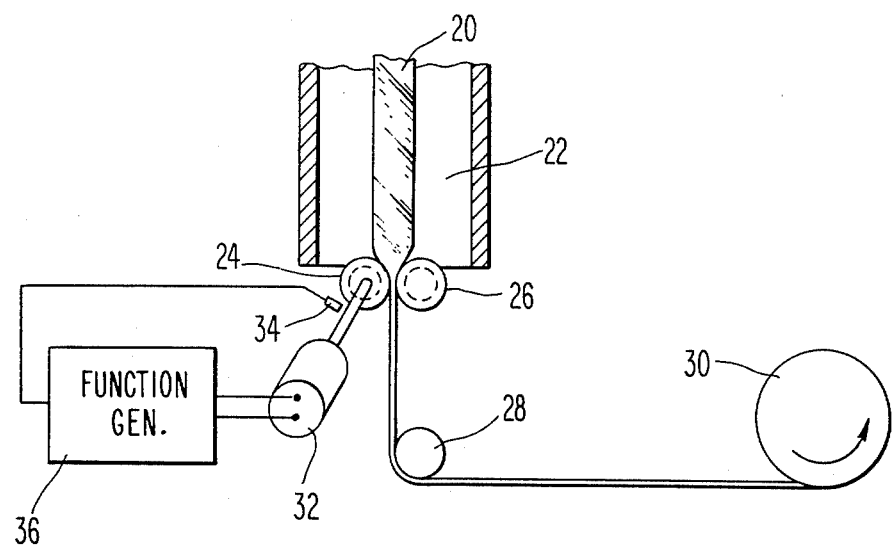
*Fig. 7*
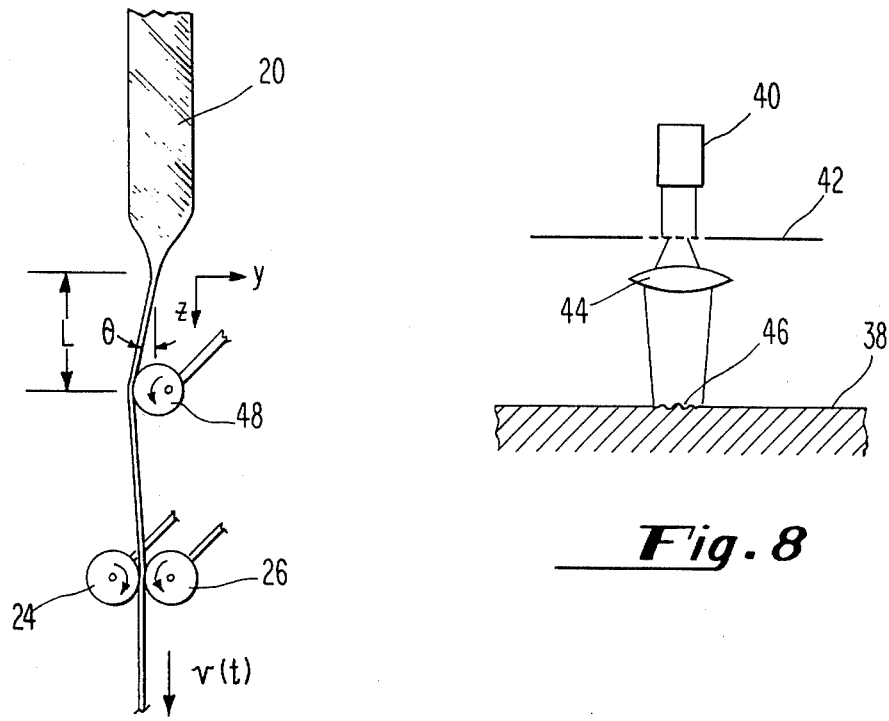
*Fig. 8*
*Fig. 9*

METHOD OF EFFECTING COUPLING OF SELECTED MODES IN AN OPTICAL WAVEGUIDE

BACKGROUND OF THE INVENTION

The present invention relates to optical waveguides, and more particularly to means for minimizing the degeneration of signals transmitted to discrete modes along such waveguides.

For many years it has been recognized that light can be transmitted along strands of transparent material through the mechanism of internal reflection. This phenomenon is easily explained in a "step" waveguide, for example according to geometrical optics inasmuch as light rays reflect from the inner surface of the optical material, or more precisely from the interface of the core and an outer cladding having a smaller index of refraction. Also according to geometrical optics, if the light rays strike the outer surface of the transmitting member at some angle less than a predetermined maximum angle they will be continuously re-reflected along the waveguide with a minimal loss in energy. The principal loss of energy which is encountered by the light rays is simply attributable to the transmissivity of the medium.

More recently it has been discovered that elongate strands of light-transmissive material of extremely small cross-sectional size can be used to propagate light energy in various discrete modes, analogous to the transmission of microwaves. More particularly, when the radius of a glass waveguide is small compared to the wavelength of light being transmitted, for instance less than approximately $$\frac{2.4 \lambda}{2\pi n/2\Delta},$$

where $\lambda$ is the wavelength of the light, $n$ is the refractive index of the core and $\Delta$ is the fractional index difference between the core and the cladding, the light energy will be propagated in the structure as a single electromagnetic mode. More generally, for a given waveguide the light energy will no longer propagate in the waveguide core but will radiate from the waveguide and be lost. A detailed treatment of modal propagation may be found in "Fiber-Optics—Principles and Applications" by N. S. Kapany, published by the Academic Press of New York, N. Y.

Owing to the relatively small attenuation of the light energy in discrete modes, it is desirable to cause light energy to remain in these modes. Owing to the great number of available modes in practically-sized waveguides, when the light energy traversing the guide is modulated in order to transfer information through the guide the modulated information flows in at least several modes simultaneously.

Owing to the fact that the velocity of propagation of transmitted light is different for each mode, and that light energy introduced into the waveguide will be divided among the various modes, a light pulse entering the waveguide at one end will be seen to divide or "stretch" as it travels down the waveguide, exiting as a wider, or less well defined signal. This corresponds to a reduction in bandwidth of the signal transferring mechanism, and may be conceived of as resulting from the arrival of different elements of the transmitted pulse at different times.

In order to provide substantially equal transmission time for a signal propagated by different modes, it has been postulated that the signals in each mode should be periodically transferred or "coupled" to other modes.

A simplified illustration of this phenomenon would be as follows: consider several automobiles starting together, but in different lanes of a multi-lane highway. The speed allowed each vehicle is different for each lane of the highway, so that when the end of the highway is reached vehicles in the progressively lower speed lanes will arrive at progressively later times.

Now suppose that at relatively frequent intervals the vehicles are caused to switch lanes in substantially random fashion. At the end of a long highway each vehicle would have traversed each of the different speed lanes for a substantially equal amount of time, so that the average speed of each vehicle would be substantially the same. Accordingly, the vehicles would now reach the end of the highway at substantially the same time.

According to optical waveguide theory, the highway lanes may be analogized to light transmission modes. By causing light energy in each mode to repeatedly transfer to some other mode, the "mixing" of transmission modes will cause modulations of the light energy to propagate down the waveguide at a substantially uniform velocity. Hence, a modulation or signal traveling by several different modes will arrive at the distal end of a waveguide substantially simultaneously. This will substantially eliminate the stretching or degeneration of the modulation or, in other words, improve the signal bandwidth of the waveguide.

It is known that the intermixing, or coupling, of light energy between the modes along a length of waveguide will effect this result. It is also known that practically any sort of perturbation or variance of waveguide parameters will cause scattering or coupling of modes, whereby energy in a first mode will be converted to a second mode, and conversely. (See, e.g. "Theory of Dielectric Optical Waveguides" by D. Marcuse, published by the Academic Press.) The relatively uncontrolled nature of the coupling ordinarily provided, however, causes the energy in the desirable (bound or guided) modes to be converted or coupled into undesired (i.e. unbound or radiation) modes which effects a loss of light energy.

In an effort to minimize the coupling of light energy to the radiation modes it has been suggested that perturbations be formed in a waveguide by randomly-generated signals, or "noise." One example of an application of this theorem can be found in U.S. Pat. No. 3,687,514—Miller et al. The Miller et al patent suggests that the randomness of the scattering or coupling of the energy modes can be minimized by in effect filtering the noise, cutting off undesirably high frequency signals. Statistically, this is intended to effect coupling only among bound modes. However, the coupling is still not fully controlled and moreover a prescribed degree of coupling among only predetermined, bound modes is difficult to achieve.

In the above-noted Miller et al patent it is further disclosed that the periodic variation in waveguide parameters may consist of substantially the sum of all beat wavelengths taken in pairs, the variation to be repeated along the length of the waveguide. Since the number of frequencies required to couple all of the modes is very large, however, it would be extremely difficult to produce even one such periodic variation, much less an indefinitely long train of such perturbations repeated along the length of the waveguide.

Another example of an application of the general principle is found in U.S. Pat. No. 3,666,348—Marcatili. Marcatili as well as Miller et al suggest that sinusoidal perturbations may be formed along the axis of the waveguide, the frequency of the perturbations corresponding to the difference in propagation constants between the bound modes of the light propagating within the waveguide. It will be appreciated, however, that most waveguides are not identical and accordingly the necessary perturbation frequencies must be individually tailored for each individual waveguide.

For the foregoing reasons, it will now be appreciated that it would be desirable to provide a method for effecting a prescribed coupling of propagated light signals in waveguides, whose properties may vary from one to another, in order to achieve the desired coupling among certain bound transmission modes.

It is therefore an object of the present invention to provide a method for effecting the coupling of signals in an optical waveguide between only bound modes.

It is another object of the invention to provide a method of controlling coupling occurring between predetermined, bound light energy modes.

Yet another object is to achieve substantially uniform coupling among various, bound light energy modes.

Another object of the invention is to achieve a predetermined coupling of bound light energy modes in a manner independent of variations in modal propagation constants within and between different waveguides exhibiting substantially the same number of modes.

Still another object is to provide a predetermined coupling of bound light energy modes by forming identical perturbation functions at regular intervals along a waveguide.

SUMMARY OF THE INVENTION

Briefly stated, in accordance with one aspect of the invention the foregoing objects are achieved by determining the largest difference in propagation constant between nearest neighbor modes to be coupled, and repeatedly causing coupling of light to occur among all modes with lesser propagation constant differences. This is achieved by varying at least one of the properties of the waveguide in accordance with the Fourier transform of coupling probability. Physical properties of the waveguide which may be varied in this manner include the maximum fractional refractive index difference, the core diameter, and the curvature of the waveguide axis.

In a presently preferred embodiment an optimum class of functions defining the variations are of the form:

$$\left| \frac{K(E_i \delta \beta_{max} Z)^t}{E_i \delta \beta_{max} Z} \right|$$

where K is a function whose Fourier transform is frequency limited to a fraction $E_i$ of the maximum modal propagation constant difference, $\delta \beta_{max}$. Z represents axial distance along the waveguide, t is at least 1 and $E_i$ depends on the type of perturbation.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 7 depicts one manner of executing the invention;

FIG. 8 illustrates the preparation of a surface used in carrying out the present invention; and FIG. 9 depicts another approach to carrying out the present invention.

DESCRIPTION OF A PREFERRED EMBODIMENT

Figure 1:
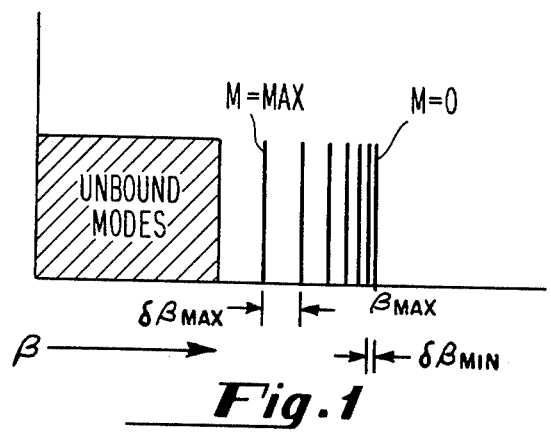
FIG. 1 is an illustration of separation of various transmission modes of an optical waveguide.

Waveguide theory predicts that light signals will propagate down an optical waveguide in attenuating modes for propagation constants below some minimum values, and in discrete, relatively non-attenuating degenerate mode groups for propagating constants over that value. In the instant illustration a first mode group m, designated mode group zero, occurs at some maximum propagation constant $\beta_{max}$. The highest available mode group for the system under consideration, designated $m_{max}$, is determined by the lowest value of the propagation constant herein denominated $\beta_{min}$. It will be understood that FIG. 1 is greatly simplified in that only a relatively few degenerate mode groups are depicted and that many more modes, numbering in the thousands, may be present in a given system.

Figure 2:
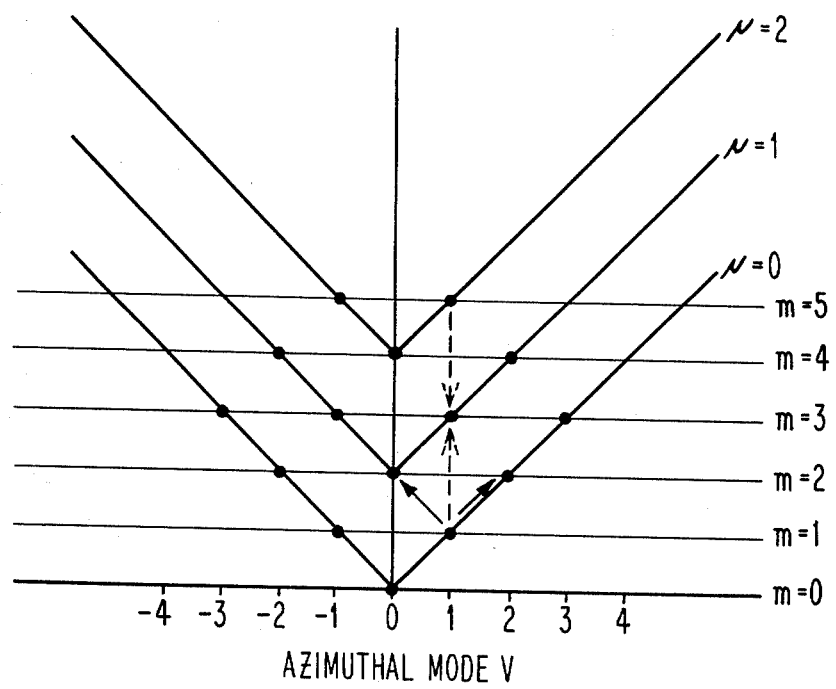
FIG. 2 represents the relationship between mode group numbers and azimuthal and radial mode numbers.

Referring now to FIG. 2, the various modes are represented as points on a plane with the mode group number m and the azimuthal mode number v as variables. The mode group number and azimuthal mode number are related by the radial mode number $\mu$ according to the relationship $$m = 2\mu + |v|$$

From mode coupling theory as set forth, for instance, in "Theory of Dielectric Optical Waveguides" by D. Marcuse (Academic Press, 1974), various types of perturbations of waveguide parameters will serve to couple different classes of modes. For example, FIG. 2 illustrates that an asymmetric perturbation lying at some point along a waveguide can couple only those modes which differ in v values by an integer and whose $\mu$ values differ by zero or an integer; and therefore m-values which differ by an integer. This type of coupling, i.e. by means of a perturbation which gives rise to asymmetric reflections, is represented by the solid arrows in FIG. 2, whereby both v- and m-values change with coupling.

Alternatively, perturbations may give rise to reflections which are symmetric with respect to the waveguide axis. In this event, two cases of mode coupling may occur. In the first case, the perturbation will be assumed to be azimuthally constant, e.g. variations in diameter. In an ideal waveguide coupling will then only occur between modes having the same v-value, but whose μ-values differ by an integer. From FIG. 2 it will be seen that the mode group numbers m of such modes differ by even integers; such coupling is indicated by the dashed arrows in FIG. 2.

For perturbations having an even azimuthal symmetry, e.g. a flattening of the waveguide upon opposite sides, coupling will only occur between modes whose v-values differ by zero or an even integer, and whose μ-and m-values differ by zero or any integer.

In order to obtain the maximum improvement in mode dispersion it will be understood that coupling should occur between modes whose m-and v-values differ by ±1. Some benefit will, however, be achieved if coupling occurs only between mode group numbers separated by ±1. The former condition will occur in the presence of perturbations which give rise to asymmetric reflection.

From FIG. 1 it will also be seen that the spacings, or intervals, between adjacent bound mode groups increase as mode group numbers increase. In order to cause light energy propagating in one mode (for instance the lowest order mode) to be coupled into a different mode (for instance the next lowest order) a change in propagation constant having a value $\delta\beta_{min}$ must occur. Signal theory predicts that the converse will also be true, i.e., when signals propagating in mode 1 encounter a change in propagation constant equal to $\delta\beta_{max}$ they can couple into mode zero.

The coupling is far more likely between adjacent modes than non-adjacent ones. In fact, for the case of random bending of a waveguide the probability of one mode coupling to another is approximately $1/\delta\beta^4$. It would then seem that the amount and degree of coupling which occurs can be controlled by varying the refractive index and the geometric parameters or curvature of the guide or, using the present notation, providing changes in $\delta\beta$.

Yet another factor in mode coupling is the radial refractive index profile parameter $\alpha$ of a given waveguide. It can be shown that the change in propagation constant between adjacent mode groups as a function of the mode group number m is $$\delta\beta_{m,m\pm1} = (\frac{\alpha}{\alpha+2})^{\frac{1}{2}} 2 \frac{\sqrt{\Delta}}{a} (\frac{m}{M})^{\frac{\alpha-2}{\alpha+2}} \quad (1)$$

where $\Delta$ is the fractional index difference between the core and the cladding and $$M = m_{max} = (\frac{\alpha}{\alpha+2})^{\frac{1}{2}} \frac{2\pi}{\lambda} na \sqrt{\Delta} .$$

In the last expression n and $\lambda$ are the axial core index and the wavelength of transmitted light, respectively.

Figure 3:
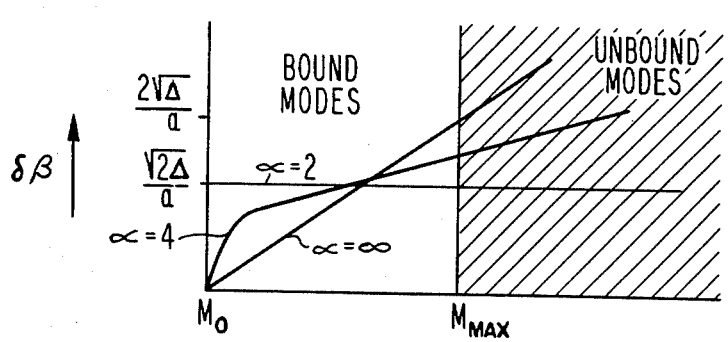
FIG. 3 is a graphical illustration of the effect of changes in a waveguide characterization parameter.

The relationship of equation (1) given above is illustrated in FIG. 3. The value of $\delta\beta$ as a function of mode group is depicted for three values of $\alpha$. As is apparent from equation (1), for $\alpha$ equal to 2, $\delta\beta$ has a fixed value of $$\frac{\sqrt{2\Delta}}{a}$$

for all modes, bound and unbound, where a is the radius of the waveguide core. A perturbation having these axial spatial frequencies or an integral multiple thereof (depending upon the specific symmetry of the perturbation as described above) while providing uniform coupling among all bound modes also provides coupling to underbound modes, as depicted in FIG. 3. While it would be desirable to achieve generally uniform coupling among the bound modes, substantial coupling into unbound modes cannot be tolerated.

For a value of $\alpha$ approximating infinity, FIG. 3 discloses that a linear relationship exists between $\delta\beta$ and mode group numbers. When $\alpha$ is equal to infinity, the $\delta\beta$ value corresponding to the maximum mode $m_{max}$ is $$\frac{2\sqrt{\Delta}}{a}$$

From equation (1) it will further be seen that for all other values of $\alpha$ the maximum difference between propagation constants $\delta\beta_{max}$ approaches $$(\frac{\alpha}{\alpha+2})^{\frac{1}{2}} \frac{2\sqrt{\Delta}}{a}$$

as m approaches $m_{max}$. By way of example this is illustrated in FIG. 3 for the case of $\alpha=4$. It will therefore be appreciated that for values of $\alpha$, other than those near $\alpha=2$, coupling may be constrained to only bound modes by restricting the axial spatial frequencies of the perturbations(s) to be $$(\frac{\alpha}{\alpha+2})^{\frac{1}{2}} \frac{2\sqrt{\Delta}}{a}$$

or less.

Figure 4:
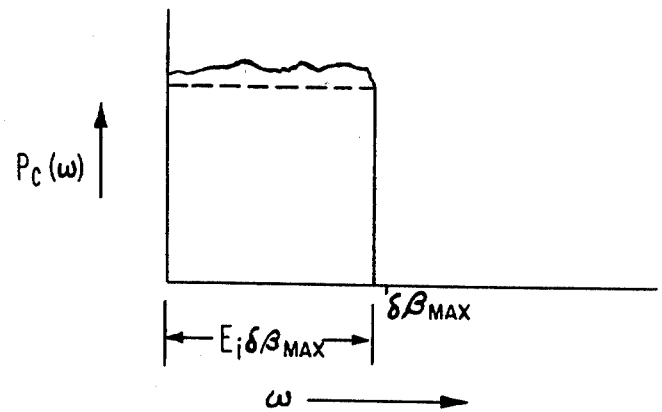
FIG. 4 depicts a desired functional response of a waveguide system.

In addition to achieving coupling among all of the various propagating bound modes of a light signal, in order that a statistically averaged coupling be achieved among all modes it is desired that a power spectrum of coupling strengths be required which would uniformly couple all of the bound modes, but not couple to any radiation modes. Such a function is illustrated in FIG. 4 wherein the coupling strength power spectrum $P_c$ is plotted as function of spatial frequency $\omega$. It is desired that the coupling strength power spectrum $P_c(\omega)$ decline to a value of substantially zero, arbitrarily close to $\delta\beta_{max}$ so that all bound modes may be coupled. In addition, it may be desirable to have completely uniform coupling, as illustrated in FIG. 4 by the horizontal dotted line.

From Fourier transform theory, a function f(z) can be determined which will give the desired coupling strength power spectrum. In particular, $$P_c(\omega) = A \int_{-\infty}^{\infty} f(z) e^{-i\omega z} dz \quad (2)$$

where A is an arbitrary constant, and z represents the axial distance along a waveguide. The function f(z) represents physical changes in the waveguide along its length which effect perturbations in wave propagation, or to use the foregoing notation, change the propagation constant of a given mode. Physical changes that f(z) might represent are a curvature of the axis of the waveguide; fluctuations in waveguide diameter; and/or fluctuations in the relative indices of refraction of the waveguide and its surrounding material. The thesis of the present invention is that by implementing a proper function f(z), perturbations having the correct azimuthal variation $s(\phi)$ can be created to provide uniform coupling between adjacent and next-adjacent modes spaced by less than some fraction $E_i$ of $\delta\beta_{max}$ without coupling to radiation modes.

It has been determined that an optimal function f(z)

$$f(z) = C \left| \frac{\sin(E_i \delta\beta_{max} z)}{E_i \delta\beta_{max} z} \right| \quad (3)$$

Figure 5:
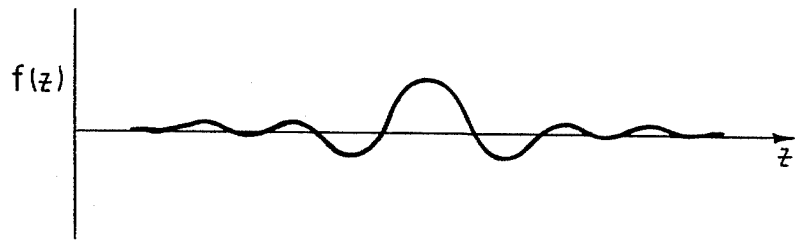
FIG. 5 illustrates an optimal function to achieve the response of FIG. 4.

Such a function is represented in FIG. 5; it exhibits a maximum excursion at its center or point of symmetry and progressively lesser excursions at either side of the point of symmetry, the excursions rapidly approaching zero, in accordance with the function. While the above-described function is optimal for waveguides for the type under consideration it will now be recognized that there are other, similar functions whose inverse Fourier transforms will provide the band-limited function $P_c$ depicted in FIG. 3. The inverse transforms of such functions, while not necessarily uniform, are substantially zero for some value $E_i\delta\beta$ which is arbitrarily close to $\delta\beta_{max}$. Other examples of such functions are $$f(z) = C_1 \left| \frac{\sin(E_i \delta\beta_{max} z)}{E_i \delta\beta_{max} z} \right|^2 \quad (4)$$

and $$f(z) = C_2 \left| \frac{J_1(E_i \delta\beta_{max} z)}{2 E_i \delta\beta_{max} z} \right| \quad (5)$$

where $J_1$ is a Bessel function of the first order.

Equations of the type described above, whose inverse Fourier transforms exhibit the band-limiting characteristics of function $P_c$ are herein referred to as functions of the type $$\left| \frac{K(E_i \delta\beta_{max} z)}{E_i \delta\beta_{max} x} \right|^t \quad (6)$$

where K is a specified function, t is at least one, $E_i$ represents some arbitrarily large fraction of $\delta\beta_{max}$, and z represents axial distance along the waveguide.

The value of $E_i$ may be determined from measurement of the effective near and far-field radiation patterns of a long length of waveguide. It is shown that in practical waveguides there is some attenuation for even the bound modes of light energy, and that this attenuation varies with the mode group number. See, for instance, "Measurement of Differential Mode Attenuation in Graded-Index Fiber Optical Waveguides" by R. Olshansky, S. M. Oaks, and D. B. Keck Topical Meeting on Optical Fiber Transmission II, Williamsburg, Va. 1977. This attenuation reduces the effective core diameter and Δ-value of the waveguide.

By experimentally measuring the effective core diameter from the transmitted near-field light intensity pattern as well as the effective Δ-value from the maximum light angle in the far-field pattern, $\theta_{max}$, determined after a long length of waveguide from the relation $$\Delta_{eff} = \frac{\sin^2 \theta_{max}}{2n^2}$$

the effective maximum mode group number $M_{eff}$ may be determined in accordance with the relation $$M_{eff} = \left( \frac{a}{a+2} \right)^{\frac{1}{2}} \frac{2\pi}{\lambda} a_{eff} n \sqrt{\Delta_{eff}}$$

The value $E_i$ may then be obtained from equation (1) in accordance with the relationship $$E_i = \frac{\delta\beta_{eff}}{\delta\beta_{max}} = \left( \frac{M_{eff}}{M} \right)^{\frac{a-2}{a+2}}$$

Figure 6:
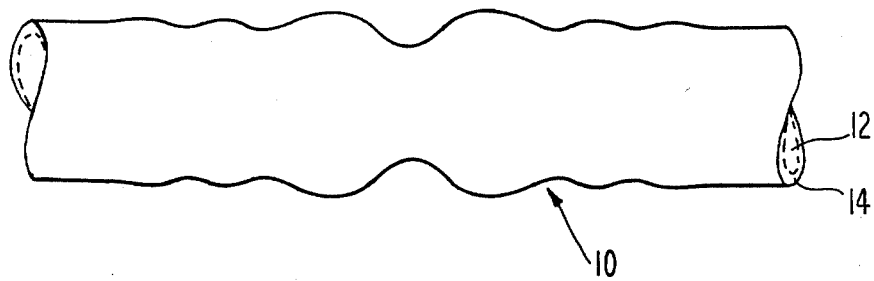
FIG. 6 illustrates a waveguide formed in accordance with the function of FIG. 5.

FIG. 6 illustrates a segment of a waveguide formed in accordance with the present invention. In FIG. 6 a waveguide 10 comprises a core 12 and a cladding 14. The core and cladding materials exhibit differing indices of refraction in order to achieve the internal reflection of waves which is required for waveguide operations. As is recognized by those skilled in the art, the core and cladding materials need not be separate, discrete layers; rather, a monolithic waveguide member may be so treated (as for instance is produced by vapor phase deposition processes) to cause the radially outermost portions of the guide (herein designated 14) to exhibit an index of refraction differing from that of the inner portion or "core."

The core 12 of FIG. 6 is provided with physical perturbations which effect perturbations in the waveguide propagation constants $\beta_m$. Fluctuations in the diameter of core 10 in accordance with the amplitude of signal f(z) are provided as shown, and may correspond to the function represented in FIG. 5. Such perturbations are repeated along the length of the waveguide spaced by appropriate distances $L_c$. While the number of repetitions of such perturbations is not critical, they must be frequent enough to statistically average the propagation speeds of the various modes propagated in the waveguide.

Similar perturbations may also be produced by modifying the relative index of refraction in magnitudes and at points corresponding generally to the function f(z) shown in FIG. 5. Such a modification, while not susceptible of illustration, may be carried out by doping, vapor deposition, or other processes at discrete intervals along the waveguide axis.

It will now be recognized that if the effective locus of the waveguide axis exhibits a curvature in accordance with a function f(z) (whose Fourier transform is illustrated in FIG. 4) uniform coupling can be achieved between adjacent modes in the waveguide.

The actual waveguide shape y(z) may be determined by solving the relation $$\frac{d^2y(z)}{dz^2} = \left| \frac{K(E_i\delta\beta z)}{E_i\delta\beta z} \right|$$

Because of the asymmetric nature of the perturbation with respect to the waveguide axis, coupling occurs not only between various degenerate mode groups, but also between groups having different v-values. Accordingly, this form of coupling is more complete than that resulting from symmetric perturbations such as described with respect to FIG. 6 and comprises the presently-preferred embodiment of the invention.

Turning now to FIG. 7 there is shown in schematic form apparatus for forming a waveguide such as shown in FIG. 6. A glass waveguide blank 20 is formed in a conventional manner and is disposed in furnace 22 and maintained at an appropriate temperature for softening the glass so that it may be drawn. Drawing rolls 24, 26 are linked together, as shown, and draw the glass from the blank into an elongate strand which is passed about a conforming roller 28 and wound upon a drum 30.

A servo motor 32 is coupled to drawing rolls 24, 26 and a transducer 34 provided to feed back a signal representing roll speed, and thus drawing speed. The fed back signal is applied to a function generator 36 which controls the operation of servo motor 32.

In operation, it is initially assumed that drawing rolls 24, 26 are operated at constant speed by motor 32. After transducer 34 counts a predetermined number of revolutions, signifying the passage of a length of waveguide generally corresponding to the interval $L_c$, function generator 36 is actuated to vary the speed of motor 32 in accordance with the foregoing function f(z). By speeding up motor 32 the waveguide is drawn more rapidly, producing a reduced diameter; slowing the motor effects an enlargement in waveguide diameter. In this manner by applying a drive signal similar to that of FIG. 4 to motor 32, a waveguide having perturbations such as those shown in FIG. 6 may be produced.

From the foregoing discussion it will be recalled that if the perturbation is azimuthally constant, only coupling between mode group numbers differing by ±2 and having constant azimuthal code numbers will occur. While this is not necessarily the most desirable type of coupling, it will nevertheless be beneficial in terms of diminished dispersion.

FIG. 8 illustrates a method for effecting perturbations in a waveguide in accordance with a function which describes the optimum curvature of the waveguide axis. A substrate of photosensitive material 38 is provided, the material whose thickness after developing is determined by its exposure to radiant energy. One example of such a material is commonly-used photo resistant material. Portions of such material exposed to radiant energy of an appropriate wavelength become "fixed" while exposed portions do not. Upon development the "fixed" portions remain in place, while the non-fixed portions are washed away in proportion to the intensity of incident light.

Still another approach to providing a curvature function y(z) is to effect a transverse or y-axis displacement of a waveguide as it is drawn along a predetermined path or z-axis. This introduces a controlled curvature such as that characterized in FIG. 5 into the waveguide axis, which upon cooling, is retained. As shown in FIG. 9, an appropriately shaped eccentric 48 is disposed between the lower end of a blank 20 and a drawing tractor comprising rolls 24, 26. Controlled rotation of block 48 causes the waveguide to be displaced transversely by some instantaneous angle θ, thus introducing a curvature into the axis of the waveguide. The rotational speed of the eccentric block is controlled with reference to the pulling speed of the waveguide, determined by the rotation of pulleys 24, 26.

With the arrangement of FIG. 9, the slope of the waveguide at the fiber root is given by the expression $$\frac{dy}{dz} = \tan \theta [z(t)] = \frac{h[\Omega(t)]}{L}$$

where $\Omega(t)$ is the function describing the time varying angular rotation of member 48, and h is the minimum distance from its shaft to the fiber.

By way of illustration, in a successfully tested embodiment an optimum curvature function had the form $$\frac{d^2y}{dz^2} = \frac{\sin(E_i\delta\beta_{max}z)}{E_i\delta\beta_{max}z}$$

integrating this expression with respect to z gives:

$$\frac{dy}{dz} = y_0 + Si(z)$$

where $y_0$ is an initial value along a y-axis, and Si (z) is a well known tabulated function, for instance as set forth in *Sammlung von Formeln der Mathematik*, by W. Laska, F. Vieweg and Sohn, published by Braunschweig, 1894. Accordingly, it will be seen that $$h[\Omega(t)] = L(y_0 + Si[z(t)])$$

where $z(t) = vt$ and $\Omega(t) = \Omega_0 t$

Once the rotational speed $\Omega(t)$ of block 48 is specified, the appropriate function h can then be determined and the surface of the block machined to a corresponding configuration. This approach may also be applied in order to implement any other desired function y(z).

It will now be appreciated that there has been taught herein an improved method for forming optical waveguides, whereby coupling among only discrete modes is accomplished in an economical fashion. Further, and as will be evident from the foregoing description, certain aspects of the invention are not limited to the particular details of the examples illustrated and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. For an optical waveguide supporting light transmission in a plurality of bound modes, said modes each corresponding to a propagation constant β, the difference between the propagation constant of adjacent modes being δβ, and further a plurality of unbound modes in which light is attenuated, the method of effecting coupling of light among only said bound modes, comprising the steps:

selecting an arbitrarily large fraction $E_i$ of the largest propagation constant difference $\delta\beta_{max}$ between adjacent bound modes; and varying at least one of the following properties of the waveguide:

curvature of the axis of the waveguide, fluctuation in waveguide diameter, and fluctuation in the indices of refraction of the waveguide, at at least one location along the length of the waveguide in accordance with the expression $$\left| \frac{K(E_i \delta\beta_{max} z)}{E_i \delta\beta_{max} z} \right|^t$$

where K is a specific function the inverse transform of which is substantially zero for a value $E_i\beta$ which is arbitrarily close to $\delta\beta_{max}$, t is at least 1, and z represents distance along the waveguide.

2. The method according to claim 1, wherein the coupling is achieved by varying the diameter of the waveguide in accordance with said expression.

3. The method according to claim 2, wherein the diameter of said waveguide is varied by varying the speed at which said waveguide is drawn from a blank in accordance with said expression.

4. The method according to claim 1, wherein the coupling is achieved by causing the axis of the waveguide to deviate from a substantially straight line in accordance with said expression.

5. The method according to claim 4, wherein said waveguide axis is caused to deviate from a substantially straight line by providing a drawing blank, heating said blank to soften at least a portion thereof, drawing said blank into an elongate waveguide along a predetermined path, providing a rotatable eccentric means adjacent said path, and rotating said eccentric means to displace said waveguide from said path, whereby the axis of the waveguide is caused to permanently deviate from a substantially straight line.

6. The method according to claim 1, wherein the coupling is achieved by causing the index of refraction of the waveguide to deviate from a constant value in accordance with said expression.

7. The method of effecting coupling among light waves propagating along an optical waveguide of length Z in bound modes, each of said modes being characterized by a unique propagation constant $\beta$, the difference between propagation constants for adjacent modes being $\delta\beta$, the largest difference between the propagation constants for any two adjacent ones of said bound modes being $\delta\beta_{max}$, comprising the steps of:

physically deforming the waveguide at periodic intervals, the form of the physical deformation being defined by the expression $$\left| \frac{K(E_i \delta\beta_{max} z)}{E_i \delta\beta_{max} z} \right|^t$$

where K is a specific function the inverse transform of which is substantially zero for a value $E_i\beta$, which is arbitrarily close to $\delta\beta_{max}$, and where $E_i\beta$ is an arbitrarily large fraction of $\delta\beta_{max}$ and t is at least 1.

8. The method according to claim 7, wherein K is a sinusoidal function.

9. The method according to claim 7, wherein K is a Bessel function of the first order.

10. The method according to claim 7, wherein the waveguide is deformed by providing undulations in the diameter of the waveguide, said undulations corresponding to said expression.

11. The method according to claim 7, wherein the axis of the waveguide is caused to deviate from a straight line in accordance with said expression.

12. The method according to claim 11, further including the step of providing a photosensitive surface whose thickness after developing is determined by the degree of its exposure to radiant energy:

providing a source of radiant energy spaced from said surface;

directing said radiant energy through an aperture to diffract said energy to produce an energy distribution upon said photosensitive surface in accordance with said expression;

developing said photosensitive surface to produce a surface exhibiting undulations in correspondence with said expression; and impressing a length of said waveguide against said developed, photosensitive surface to effect undulations in the axis of said waveguide.

13. An optical waveguide supporting light transmission in a plurality of bound modes, said modes each corresponding to a propagation constant $\beta$, the difference between the propagation constant of adjacent modes being $\delta\beta$, and further a plurality of unbound modes in which light is attenuated, said waveguide having variations in at least one of the following properties of the waveguide:

curvature of the axis of the waveguide, fluctuation in waveguide diameter, and fluctuations in the indices of refraction of the waveguide, said variations occurring at at least one location along the length of the waveguide in accordance with the expression $$\left| \frac{K(E_i \delta\beta_{max} z)}{E_i \delta\beta_{max} z} \right|^t$$

where K is a specific function the inverse transform of which is substantially zero for a value $E_i$, which is arbitrarily close to the maximum $\delta\beta_{max}$ in said difference, t is at least 1, and z represents distance along the waveguide.

* * * * *